(12) United States Patent
Sowle et al.

(10) Patent No.: US 9,429,400 B1
(45) Date of Patent: Aug. 30, 2016

(54) FLOW CONTROL DEVICE AND METHOD FOR AIRCRAFT AND MISSILE FOREBODY

(75) Inventors: Zak Sowle, Shaker Heights, OH (US); Srikanth Vasudevan, Cleveland, OH (US); Russell Stucke, Cleveland, OH (US); Frederick J. Lisy, Euclid, OH (US); Robert N. Schmidt, Cleveland, OH (US)

(73) Assignee: Orbital Research Inc., Cleveland, OH (US)

( * ) Notice: Subject to any disclaimer, the term of this patent is extended or adjusted under 35 U.S.C. 154(b) by 1133 days.

(21) Appl. No.: 12/615,218

(22) Filed: Nov. 9, 2009

Related U.S. Application Data

(63) Continuation-in-part of application No. 11/800,606, filed on May 7, 2007, now Pat. No. 7,977,615, which is a continuation of application No. 10/766,225, filed on Jan. 28, 2004, now Pat. No. 7,226,015, which is a continuation of application No. 10/336,117, filed on Jan. 3, 2003, now Pat. No. 6,685,143, application No. 12/615,218, which is a continuation-in-part of application No. 11/415,534, filed on May 2, 2006, now Pat. No. 8,191,833, which is a continuation of application No. 10/750,422, filed on Dec. 30, 2003, now Pat. No. 7,070,144, which is a continuation-in-part of application No. 10/336,117.

(51) Int. Cl.
*F42B 10/02* (2006.01)
*F42B 10/14* (2006.01)

(52) U.S. Cl.
CPC ............... *F42B 10/02* (2013.01); *F42B 10/14* (2013.01)

(58) Field of Classification Search
CPC .......... F42B 10/00; F42B 10/02; F42B 10/60; F42B 10/64
USPC ............. 244/3.15, 3.21, 3.22, 3.24, 76 C, 91, 244/198, 201, 203, 204
See application file for complete search history.

(56) References Cited

U.S. PATENT DOCUMENTS

| | | | | |
|---|---|---|---|---|
| 4,039,161 | A | * | 8/1977 | Bauer ..................... B64C 23/06 244/200.1 |
| 4,512,537 | A | * | 4/1985 | Sebestyen et al. ........... 244/3.21 |
| 4,568,039 | A | * | 2/1986 | Smith .................... F41G 7/222 244/3.15 |
| 5,322,243 | A | * | 6/1994 | Stoy ........................... 244/45 A |
| 5,467,940 | A | * | 11/1995 | Steuer .......................... 244/3.11 |
| 5,593,110 | A | * | 1/1997 | Ransom et al. .............. 244/3.23 |
| 5,775,636 | A | * | 7/1998 | Vig et al. ..................... 244/3.24 |
| 6,237,496 | B1 | | 5/2001 | Abbott |
| 6,427,948 | B1 | * | 8/2002 | Campbell ............... B64C 23/06 244/130 |
| 6,685,143 | B1 | * | 2/2004 | Prince et al. .................. 244/203 |

(Continued)

OTHER PUBLICATIONS

Patel et al., "Deployable Flow Effectors for Phantom Yaw Control of Missiles at High Alpha," Jun. 24-26, 2002, 1st AIAA Flow Control Conference, St. Louis, MO, AIAA, pp. 1-12.*

(Continued)

*Primary Examiner* — Marc R Burgess
(74) *Attorney, Agent, or Firm* — Brian Kolkowski; Robert K. Schmidt

(57) ABSTRACT

A forebody flow control system and more particularly an aircraft or missile flow control system for enhanced maneuverability and stabilization utilizes various types of sensors and various types of activatable flow effectors to maneuver the aircraft or missile with the help of a control system. A method of operating the flow control system is also disclosed.

13 Claims, 7 Drawing Sheets

(56) References Cited

U.S. PATENT DOCUMENTS

| | | | |
|---|---|---|---|
| 7,028,954 B2 * | 4/2006 | Van Dam | B64C 3/44 244/204 |
| 7,226,015 B1 | 6/2007 | Prince et al. | |
| 7,267,298 B2 * | 9/2007 | Leininger | 244/3.24 |
| 8,167,554 B2 * | 5/2012 | Wang | F03D 1/0608 244/204.1 |
| 2005/0001088 A1 * | 1/2005 | Lamorlette | G05D 1/108 244/3.15 |

OTHER PUBLICATIONS

Pike, John. "XM1156 Precision Guidance Kit (PGK)". Web page. May 30, 2007. http://www.globalsecurity.org/military/systems/munitions/m1156.htm.

* cited by examiner

FLOW CONTROL DEVICE AND METHOD FOR AIRCRAFT AND MISSILE FOREBODY

CROSS REFERENCE TO RELATED APPLICATIONS

This application claims priority from two co-pending patent applications, both of which trace their priority to U.S. patent application Ser. No. 10/336,117 filed Jan. 3, 2003. This application is a continuation in part of U.S. patent application Ser. No. 11/800,606 filed May 7, 2007, issued as U.S. Pat. No. 7,977,615 on Jul. 12, 2011, which was a continuation of U.S. patent application Ser. No. 10/766,225 filed Jan. 28, 2004, issued as U.S. Pat. No. 7,226,015 on May 5, 2007, which was a continuation of U.S. patent application Ser. No. 10/336,117 filed Jan. 3, 2003, issued as U.S. Pat. No. 6,685,143 on Feb. 3, 2004. This application is also a continuation in part of co-pending U.S. patent application Ser. No. 11/415,534 filed May 2, 2006, issued as U.S. Pat. No. 8,191,833 on Jun. 5, 2012, which is a continuation of U.S. patent application Ser. No. 10/750,422 filed Dec. 30, 2003, issued as U.S. Pat. No. 7,070,144 on Jul. 4, 2006, which is a continuation in part of U.S. patent application Ser. No. 10/336,117 filed Jan. 3, 2003, issued as U.S. Pat. No. 6,685,143 on Feb. 3, 2004.

LICENSE RIGHTS

Federal Sponsored

The U.S. Government has a paid-up license in this invention and the right in limited circumstances to require the patent owner to license others on reasonable terms provided for by the terms of grant numbers F33615-98-C-3006 and F33615-99-C-3008 awarded by the Department of Defense, Air Force Research Laboratories (AFRL) at Wright Patterson Air Force Base; grant number DAAE30-02-C-1052 awarded by the U.S. Army; and contract No. W15QKN-12-C-0012 awarded by U.S. Army, ARDEC, Picatinny Arsenal, N.J.

BACKGROUND OF THE INVENTION

1. Field of the Invention

The present invention relates to a forebody flow control system and more particularly to aircraft or missile flow control system for enhanced maneuverability and stabilization, particularly at high angles of attack. The present invention further relates to a method of operating the flow control system.

2. Technical Background

In numerous aeronautical applications it is desirable to control the flow across a surface. As fluid flows over a surface, like air over an aircraft or a missile forebody, it forms a fluid boundary layer at the surface. The fluid boundary layer is a thin layer of viscous flow exhibiting certain pressure variations that affect the operation of the aircraft or a missile.

One of these variations is the separation and vortex induced phantom yaw caused by asymmetric vortex shedding on an aircraft or a missile at high angles of attack, even at zero angle of sideslip. Large forces and dynamic out-of-plane loading on the aircraft or missile occur at angles of attack ranging from 30 to 60 degrees. It is known that the out-of-plane loading results from micro-asymmetries on the surface of the nose of the aircraft or missile such as dents, cracks in the paint and other microscopic imperfections near the tip of the nose. It has also been known that these asymmetries are affected by the bluntness of the forebody, Reynolds Number; roll angle, and the angle of attack. At high angles of attack, these side forces (yaw) are especially pronounced due to ineffectiveness of the traditional flight control surfaces. Side forces resulting from these asymmetries adversely affect the missile or aircraft's performance and significantly limit their flight envelope.

The demand for better control of missiles or aircraft at high angles of attack has led to a number of approaches for control of these side forces. Flow control devices have been employed to control and counteract these side forces. These flow control devices are either passive or active. Passive flow control devices have included geometric changes to the forebody structure such as nose bluntness, strakes, boundary layer strips, vane vortex generators and rotating nose tips to control the asymmetric vortices off the forebody. These passive flow control techniques are effective to some extent in alleviating these side forces, but at the same time limit the performance of the aircraft or missile by increasing the drag. Active flow control devices have included jet blowing, unsteady bleed, suction, blowing and deployable flow effectors to control the asymmetric vortices off the fore body. These active flow control techniques are (as with passive devices) also effective to some extent in alleviating these side forces, but also not optimized (as with passive devices), because they operate in an open-loop mode with no sensor feedback, at the same time limit the performance of the aircraft or missile by increasing the drag.

In view of the foregoing disadvantages with presently available passive or active flow control systems and methods for controlling flow asymmetries on a missile or an aircraft, it has become desirable to develop a missile or aircraft forebody flow control system that controls both the magnitude and direction of these side forces (and further the aircraft or missile maneuverability), and can be deactivated when not required in order to reduce drag.

SUMMARY OF THE INVENTION

The present invention relates to a forebody flow control system and more particularly to aircraft or missile flow control system for enhanced maneuverability and stabilization particularly at high angles of attack. The present invention further relates to a method of operating the flow control system.

The aircraft and missile or the present invention can include but are not limited to self-propelled, partially propelled or assisted, and aircraft and missiles that are either launched or shot by another device to gain the proper momentum. The aircraft and missiles include but are not limited propelled missiles, gun launched missiles, gun launched munitions, mortars, gliders, bombs, unmanned air vehicles, jets, space craft, cruise missiles, ballistic missiles, space launched vehicles, gas turbine powered aircraft, and the like.

The systems of the present invention utilize activatable flow effector or active flow control devices. The activatable flow effectors or active flow control devices of the present invention are unconventional flow surfaces that are electromechanical, electropneumatic, electrohydraulic, fluidic, and other types of devices, which can be used to create disturbances in the flow over the surface of the missile or aircraft. Preferably, the activatable flow effector or active flow control devices induce small disturbances, micro-vortices or perturbances in the vicinity or close proximity to the activatable flow effector or active flow control device. Further preferably, the activatable flow effector or active flow control device is flush or nearly flush, when deactivated, with the surface of the missile or aircraft to which it has been installed thereby creating little or no drag on the missile or aircraft when in an inactive state. Still further preferably, the activatable flow effector or active flow control devices have no hinged parts or surfaces. The activatable flow effector or active flow control devices of the present invention include but are not limited to active vortex generators, which are deployable including but not limited to flow deflectors, balloons, microbubbles, and dimples or create active pressure active regions by suction or air pressure; synthetic jets including zero-net-mass synthetic jets; pulsed vortex generators; directed jets; vortex generating devices (fluidic and mechanical) plasma actuators including weakly ionized plasma actuators and single barrier dielectric discharge actuators; wall turbulators; porosity including but not limited to reconfigurable, inactive and active; microactuators; and thermal actuators.

The systems of the present invention utilize a range of sensors for maneuvering or stabilizing the aircraft or missile during flight. The sensors for example may be used to determine the aircraft's or missile's relative position with respect to a moving target or target location, the flow dynamics on the aircraft's or missile's flow surface, and threats or obstacles in or around the aircraft or missile. The sensors for determining the aircraft's or missile's relative position may include but are not limited to antennas for acquiring global positioning (GPS), magnetic sensors, solar detectors, inertial measurement unit (IMU), and the like. The sensors for determining the flow dynamics may include but are not limited to a static and/or dynamic pressure sensor, shear stress sensor (hot film anemometer, a direct measurement floating-element shear stress sensor), inertial measurement unit or system, and other sensors known to those skilled in the art whose signal could be used to estimate or determine flow condition such as separation on the surface of the missile or aircraft, which would function as a trigger point for actuating the activatable flow effectors or active flow control devices. The sensors for determining threats or obstacles in or around the aircraft or missile include but are not limited to radar detectors, laser detectors, chemical detectors, heat (or infrared) detectors, and the like.

The controller is described in more detail in the detailed description. The controller can be predictive or can respond and actuate the activatable flow effectors based on current conditions.

In one embodiment, the present invention includes a missile or aircraft comprising an afterbody and a forebody; at least one activatable flow effector on the missile or aircraft forebody; at least one sensor generating a signal, the at least one sensor being used to identify a target; at least one sensor generating a signal for estimating or determining the aircraft's or missile's orientation, and a closed loop control system; wherein the closed loop control system is used for activating and deactivating the at least one activatable flow effector based on at least in part the signal of the sensor being used to identify a target and the signal of the sensor for estimating or determining the aircraft's or missile's orientation.

In another embodiment, the present invention includes a flow control system for a missile or aircraft forebody comprising at least one activatable flow effector; at least one sensor generating a signal, the at least one sensor being positioned to estimate or determine an effect of the at least one activatable flow effector on the missile or aircraft forebody; an inertial measurement unit having an output; and a closed loop control system; wherein the closed loop control system is used for activating and deactivating the at least one flow effector based on at least in part the signal of the at least one sensor and the output of the inertial measurement unit.

In still another embodiment, the present invention includes a method of maneuvering a missile or aircraft on the forebody comprising the steps of estimating or determining side forces on a missile or an aircraft forebody based at least in part on a signal from at least one sensor; the missile or aircraft forebody further comprising at least one flow effector and a closed loop control system for controlling the flow effectors; activating the at least one activatable flow effector with the closed loop controller based on at least in part the signal of the at least sensor; and re-estimating or determining side forces on the missile or aircraft forebody based at least in part on a signal from the at least one sensor; and deactivating the at least one flow effector in response to the re-estimated or determined side forces on the missile or aircraft forebody.

In still another embodiment the present invention includes a missile or aircraft comprising an afterbody and a forebody; at least one activatable flow effector on the missile or aircraft forebody; at least one sensor generating a signal, the at least one sensor being used to estimate or determine the missile's or aircraft's relative position with respect to a target or object and; at least one sensor generating a signal for estimating or determining the aircraft's or missile's orientation, and a closed loop control system; wherein the closed loop control system is used for activating and deactivating the at least one activatable flow effector based on at least in part the signal of the sensor being used to estimate or determine the missile's or aircraft's relative position with respect to a target or object and the signal of the sensor for estimating or determining the aircraft's or missile's orientation.

In still another embodiment, the present invention includes a missile or aircraft comprising an afterbody and a forebody; at least one activatable flow effector on the missile or aircraft forebody; at least one sensor generating a signal, the at least one sensor being used to identify a target; at least one sensor generating a signal for estimating or determining the aircraft's or missile's relative position, and a closed loop control system; wherein the closed loop control system is used for activating and deactivating the at least one activatable flow effector based on at least in part the signal of the sensor being used to identify a target and the signal of the sensor for estimating or determining the aircraft's or missile's orientation.

In still yet another embodiment, the present invention includes a missile or aircraft comprising an afterbody and a forebody; at least one activatable flow effector on the missile or aircraft forebody; at least one sensor generating a signal, the at least one sensor being used to estimate or determine a relative position of the aircraft or missile; at least one sensor generating a signal for estimating or determining the aircraft's or missile's orientation, and a closed loop control system; wherein the closed loop control system is used for activating and deactivating the at least one activatable flow effector based on at least in part the signal of the sensor being used to estimate or determine the relative position of the aircraft or missile and the signal of the sensor for estimating or determining the aircraft's or missile's orientation.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DESCRIPTION OF THE PREFERRED EMBODIMENT

Figure 1:
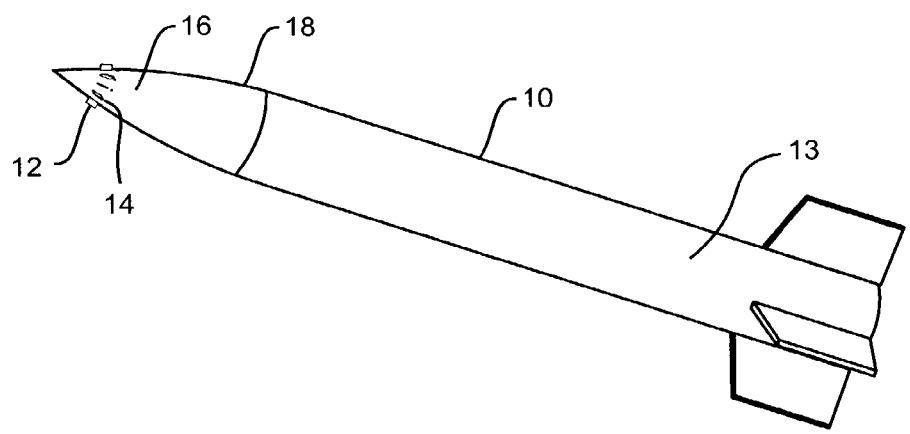
FIG. 1. Schematic view of one embodiment of a missile having a forebody with flow effectors and sensors mounted therein.

The present invention relates to a forebody flow control system and more particularly to aircraft or missile flow control system for enhanced maneuverability and stabilization preferably at high angles of attack. While high maneuvering during high angles of attack is preferred, the methods and systems of the present invention can be used also to maneuver at zero or low angles of attack. The aircraft and missile or the present invention can include but are not limited to self-propelled, partially propelled or assisted, and aircraft and missiles that are either launched or shot by another device to gain the proper momentum. The aircraft and missiles include propelled missiles, gun launched missiles, gun launched munitions, mortars, gliders, bombs, unmanned air vehicles, drones, jets, space craft, cruise missiles, ballistic missiles, and the like. U.S. Pat. Nos. 7,226,015 and 7,070,144 are herein incorporated by reference.

The forebody of the missile or aircraft for the present invention is defined as the front half of the length of the missile or aircraft. Preferably, the forebody is the front 25% of the length of the missile or aircraft, and most preferably the forebody is the nose of the missile or aircraft. The nose of the missile or aircraft is preferably a cone, parabolic, or hemi-spherical shaped leading edge. The activatable flow effectors of the present invention include but are not limited to active vortex generators, which are deployable or create pressure active regions by suction or air pressure or one of the other types of activatable flow effectors described herein or known. The present invention further relates to a method of operating the flow control system.

The flow control system for stabilization and/or maneuverability of the missile or aircraft forebody relies on the effectiveness of the activatable flow effectors in generating on-demand side forces around the missile or aircraft forebody to create the desired stabilization or maneuverability effect. The activatable flow effectors of the present invention are active micro-vortex generators that effectively control the pressure distribution along the forebody of the missile or aircraft, yielding large side forces and yawing moment for control of yaw on either side of the forebody. The activatable flow effectors of the present invention preferably are deployable flow effectors or other types of micro-vortex generators. Activatable flow effectors of the present invention are flow effectors that are activated to generate fluid flow disturbances in the vicinity of the flow effector, and that can be deactivated when not needed.

The activatable flow effector or active flow control devices of the present invention are non-conventional, preferably hingeless, electromechanical, electropneumatic, electrohydraulic, fluidic devices, which can be used to create disturbances in the flow over the surface of the missile or aircraft. Preferably, the activatable flow effector or active flow control devices, which induce small disturbances or perturbances in the vicinity or close proximity to the activatable flow effector or active flow control device. Further preferably, the activatable flow effector or active flow control device is flush or nearly flush, when deactivated, with the surface of the missile or aircraft to which it has been installed thereby creating little or no drag on the missile or aircraft. Still further preferably, the activatable flow effector or active flow control devices have no hinged parts or surfaces. The activatable flow effector or active flow control devices of the present invention include but are not limited to active vortex generators, which are deployable including but not limited to flow deflectors, balloons, microbubbles, and dimples or create active pressure active regions by suction or air pressure; synthetic jets including zero-net-mass synthetic jets; pulsed vortex generators; directed jets; vortex generating devices (fluidic and mechanical) plasma actuators including weakly ionized plasma actuators and single barrier dielectric discharge actuators; wall turbulators; porosity including but not limited to reconfigurable, inactive and active; microactuators; and thermal actuators. The present invention further relates to a method of operating the flow control system.

For stabilization and maneuverability of the missile or aircraft forebody, the flow control system relies on the effectiveness of the activatable flow effector or active flow control devices in generating on-demand forces or flow conditions at different regions around the missile or aircraft afterbody to create the desired flow effect including but not limited to stabilization or maneuverability of the aircraft or missile. Flow condition may be defined as a mode or a state of a fluid with a characteristic behavior. These states may be defined by physical factors such as: density, velocity, temperature, viscosity and pressure. Flow conditions can be of several types. Flows may be steady (not time-varying) or unsteady (time-varying), one-dimensional, two-dimensional or three-dimensional. These conditions are different for compressible and incompressible flows. Other conditions include but are not limited to, laminar, transitional, turbulent, attached, reattached, and shear flow.

The flow control system for the missile or aircraft afterbody can be used at both low and high angles of attack. The activatable flow effector or active flow control devices of the present invention are active micro-vortex generators that effectively control the pressure distribution along the afterbody of the missile or aircraft, yielding forces and yawing, rolling and pitching moments for controlling of yaw, roll or pitch on the missile or aircraft body. The activatable flow effector or active flow control devices of the present invention preferably are deployable flow effectors or other types of micro-vortex generators. Activatable flow effectors or active flow control devices of the present invention are flow effectors that are activated to generate fluid flow disturbances in the vicinity of the flow effector, and that can be deactivated when not needed. Preferably, the activatable flow effector or active flow control devices of the present invention can be operated at high frequencies. Further preferably, the activatable flow effector or active flow control devices are capable of being cycled at frequencies of at least about 1 Hz, more preferably at frequencies of at least about 20 Hz, even more preferably at frequencies of at least about 60 Hz, even more preferably at frequencies of at least about 100 Hz, and most preferably at frequencies of at least about 250 Hz. One type of active flow control device or activatable flow effector is a deployable flow effectors, which is described in more detail in the various embodiments in the Figures below. The frequencies at which the active flow control device or activatable flow effector of the present invention are cycled may be determined based in part on a number of factors including but not limited to the desired flow effect, autopilot frequency response characteristics, missile or aircraft dynamics, and missile or aircraft environmental conditions.

Some of the other types of activatable flow effectors or active flow control devices not shown in the Figures (but described in more detail in U.S. Pat. No. 6,302,360 B1 to Ng which is herein incorporated by reference) include but are not limited to spaced apart valves that are positioned at inlets of a vacuum or pressure chamber, or are connected by pneumatics to a vacuum or pressure source. Preferably, the valves contain a flap that operates to open and close the valves as directed by electrostatic forces. Other valve configurations can also be used. When the valves are opened, the negative pressure from the vacuum chamber or source causes withdrawal of air from the surface of the missile or aircraft forebody through the surface orifices. Therefore, it can be seen that the opening of the valves causes the pressure active region to generate a net inflow of air, resulting in the generation of vortices, that can be used to control the airflow around the afterbody surface of the missile or aircraft for desired control effect such as improved maneuverability and/or stability. Similarly, when the valves are open to a positive pressure chamber or source, a net outflow of air is generated resulting in the generation of vortices, which also act beneficially to reattach the air flow to the afterbody surface of the missile or aircraft. For purposes of this invention activatable flow effectors or active flow control devices include any type of device or article known to those skilled in the art or discovered at a later point that is used to assist in the reattachment of airflow to a missile or aircrafts aircraft's surface. Preferably, the activatable flow effectors or active flow control devices of the present invention are deployable flow effectors. Further preferably, the missile or aircraft of the present invention has at least about 4 activatable flow effector or active flow control devices, more preferably at least about 6 activatable flow effector or active flow control devices, even more preferably at least about 8 activatable flow effector or active flow control devices, still even more preferably at least about 50, and most preferably at least about 200. The applicants further incorporate by reference U.S. patent application Ser. Nos. 10/336,114 and 10/336,113.

Figure 2:
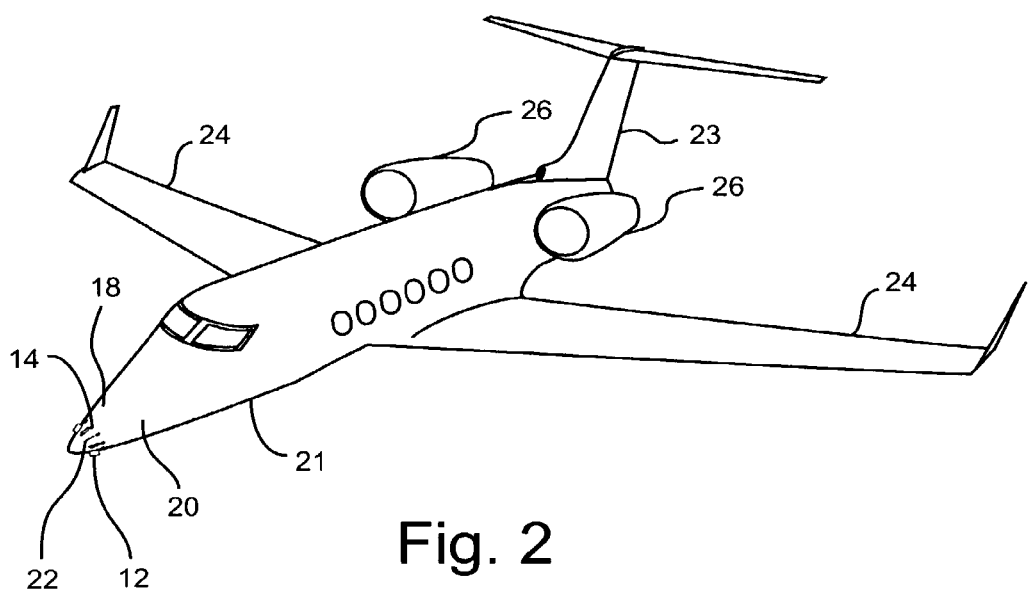
FIG. 2. Schematic view of one embodiment of an aircraft forebody with flow effectors and sensors mounted therein.

Referring now to FIG. 1, there is shown a schematic view of one embodiment of a missile 10 having a forebody 18 and an afterbody 13, the forebody 18 having at least one activatable flow effector 12, the forebody further having at least one sensor 14, the sensor being positioned to detect flow separation from the flow surface 16 on the missile 10 forebody 18. The forebody 18 of this specific embodiment has a number of flow effectors 12 and sensors 14 mounted in the forebody 18 (or nose) therein. Furthermore, in this specific embodiment, the individual flow effectors 12 and individual sensors 14 are in close proximity with respect to each other. The fluid boundary layer is a thin layer of viscous flow exhibiting certain pressure variation characteristics and fluid dynamics that affect the operation of the flow surface 16. The fluid is generally air. The flow surface 16 for purposes of the present invention is the forebody of a missile or an aircraft. FIG. 2 is a schematic view of one embodiment of an aircraft 20 adapted with the vortex generating system 22 of the present invention. The airplane can be any type of aircraft, including commercial, military and space vehicles. The aircraft 22 includes a fuselage 21, a tail 23, wings 24, forebody (nose) 18 and jet engines 26. In this specific embodiment, the individual flow effectors 12 and individual sensors 14 are also mounted in close proximity with respect to each other on the forebody 18 of the aircraft 20. Under certain conditions such as high angles of attack, the missile 10 in FIG. 1 and the aircraft 20 in FIG. 2 may experience fluid boundary layer separation.

The sensor(s) of the present invention include but are not limited to a static and/or dynamic pressure sensor, shear stress sensor (hot film anemometer, a direct measurement floating-element shear stress sensor), inertial measurement unit or system, and other sensors known to those skilled in the art whose signal could be used to estimate or determine flow separation on the surface of the missile or aircraft. The sensors of the present invention are used to determine or estimate flow separation. An inertial measurement unit for example is a sensor, which would not directly measure flow separation, but could be used to estimate or predict separation or orientation of the missile or aircraft. The preferred sensor of the present invention is a pressure sensor. The pressure sensor is used to sense flow separation. The pressure sensor can be any type of sensor suitable for measuring the pressure at the flow surface. The pressure sensor can for example be a piezoelectric device, which generates an electric signal in response to a sensed pressure, a shape memory alloy device, or any other pressure sensor or transducer known to those skilled in the art. Preferably, the ratio of flow effectors to sensors is less than about 3:1, more preferably less than or equal to 2:1, and most preferably less than or equal to 1:1. The higher the concentration of pressure sensors to flow effectors the more redundancy can be built into the system utilizing the present invention. Most preferably the sensor is a flush, surface mounted diaphragm type pressure sensor. The at least one sensor 14 has a signal which is used at least in part by a controller (not shown) to activate and deactivate the at least one flow effector 12.

In addition to flow separation sensors, various embodiments of the present invention may also include a means for determining the relative spatial orientation of the flow effectors and/or sensors with respect the flow separation on the missile or aircraft body or orientation and/or relative position of the aircraft or missile. This means would include utilizing the output of an inertial measurement unit and other systems, which could be used to determine the missile or aircraft orientation with respect to this flow separation. An inertial measurement unit provides six-degree-of-freedom motion sensing for applications such as navigation and control systems. Angular rate and acceleration are measured about three orthogonal axes.

The systems of the present invention may utilize a range of sensors for maneuvering or stabilizing the aircraft or missile during flight. The sensors are for example may be used to determine the aircraft's or missile's relative position with respect to a moving target or target location, the flow dynamics on the aircraft's or missile's flow surface, and threats or obstacles in or around the aircraft or missile. The sensors for determining the aircraft's or missile's relative position may include but are not limited to antennas for acquiring global positioning (GPS), magnetic sensors, solar detectors, inertial measurement unit or sensor (IMU), and the like. The sensors for determining the flow dynamics may include but are not limited to a static and/or dynamic pressure sensor, shear stress sensor (hot film anemometer, a direct measurement floating-element shear stress sensor), inertial measurement unit or system, and other sensors known to those skilled in the art whose signal could be used to estimate or determine flow condition such as separation on the surface of the missile or aircraft, which would function as a trigger point for actuating the activatable flow effectors or active flow control devices. The sensors for determining threats or obstacles in or around the aircraft or missile include but are not limited to radar detectors, laser detectors, chemical detectors, heat (or IR) detectors, and the like.

Figure 3:
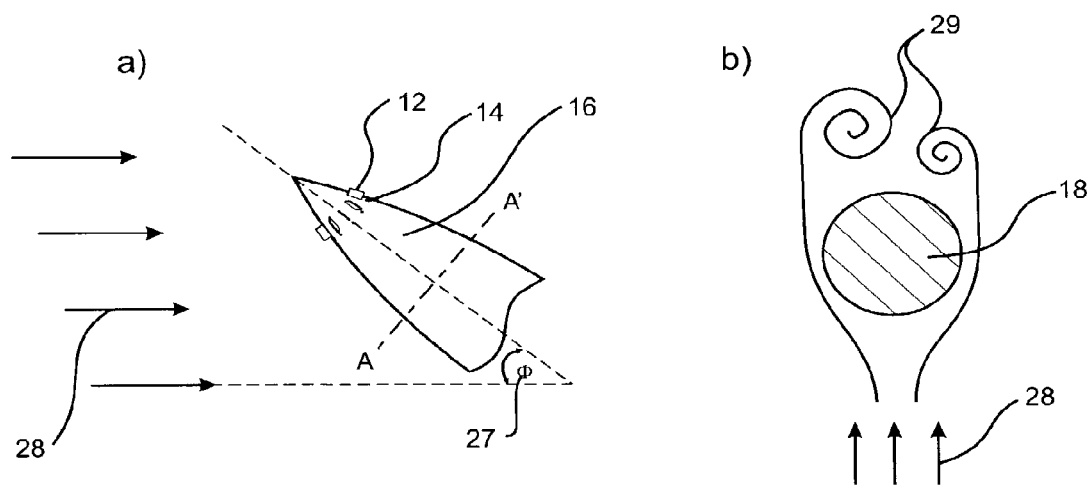
FIG. 3. a) Perspective view of one embodiment of the forebody section of a missile or aircraft having flow effectors and sensors mounted therein; b) Sectional view of forebody along plane A-A' shown in FIG. 3a).

FIG. 3a) is a perspective view of one embodiment of the forebody section of a missile or aircraft having activatable flow effectors 12 and sensors 14 mounted therein. The missile or aircraft forebody of the present invention can be designed with asymmetries in the forebody (not shown) to provide to better stability or control with the present flow control system. Boundary layer separation at the missile or aircraft forebody is caused by a combination of the viscous forces within the fluid boundary layer and an adverse pressure gradient over the flow surface 16. Controlling fluid boundary layer dynamics not only provides an overall benefit to the operation of the flow surface but also counteracts and controls fluid boundary layer separation. Due to the geometrically slender body or micro-asymmetries at the nose of a missile or an aircraft, boundary layer flow separation of the fluid flow 28 at the flow surface 16 at high angles of attack 27 may result in large side forces and dynamic out-of-plane loading resulting in a yawing moment of a missile or an aircraft. In other words, at high angles of attack)(>15° of the forebody of an aircraft or missile there may be some degree of asymmetric vortex shedding. Asymmetric vortex shedding is caused by fluid passing over the missile or aircraft and separating on one-side of the missile or aircraft prior to separation on the other (or to a greater extent). One of the objects of the present invention is to stabilize, control and/or create side forces to improve the stability and maneuverability of a missile or an aircraft. High angles of attack 27 are represented by theta ($\Phi$) 27. High angles of attack are preferably a theta ($\Phi$) 27 of at least about 20°, and more preferably a theta ($\Phi$) from about 30° to about 60°. FIG. 3b) is a sectional view of section A-A' of a missile or aircraft forebody 18 as shown in FIG. 3a). FIG. 3b) shows the fluid flow 28 around a missile or aircraft forebody 18 at a section A-A' in the proximity of the activatable flow effectors 12, and the resultant flow separation prior to activation of the flow effectors 12.

Figure 4:
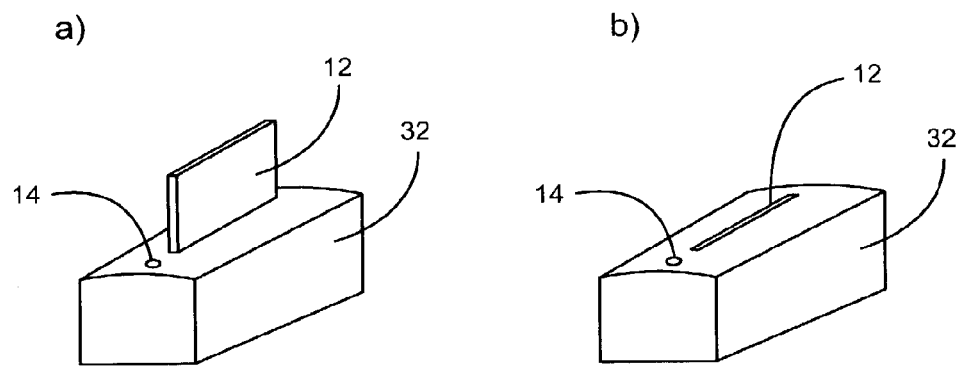
FIG. 4. Perspective view of one embodiment of a module containing a co-located sensor, and a) a deployable flow effector (deployed) and b) a deployable flow effector (retracted).

In FIG. 4, there is shown a perspective view of one embodiment of a module containing a co-located sensor, and a) an activatable, deployable flow effector (deployed) and b) an activatable, deployable flow effector (retracted). In this particular embodiment, the module 32 contains an activatable, deployable flow effector 12 and a pressure sensor 14. The activatable, deployable flow effector 12 being capable of being deployed into and retracted from, respectively, the fluid boundary layer flowing over the flow surface of the missile or aircraft forebody wherein the module 32 is employed. The deploying and retracting can be accomplished using any device such as pneumatic pressure, hydraulic pressure, vacuum, a mechanical device such as a solenoid valve, a microelectromechanical device, any combination thereof or the like. The module 32 may or may not include a controller (not shown) internal to the module. The pressure sensor 14 is connected to the controller (not shown). If the controller (not shown) is not internal to the module 32 then the module 32 preferably further comprises a link between pressure sensor 14 and the controller, and another link between the controller (not shown) and deploying means (not shown). The controller (not shown) is programmed to operate the deploying and retracting means in response to specific pressure conditions sensed at the flow surface 16. The controller (not shown) can be any device such as a computer, suitable for gathering information from the pressure sensors 14, and directing the activation of the activatable flow effectors 12. Where a number of activatable flow effectors 12 and/or pressure sensors 14 (or modules 32) are employed, the controller (or controllers) (not shown) can be programmed and connected to integrate each of the activatable flow effectors 12, pressure sensors 14 and modules 32 so that the output from all of the regions will be coordinated to enhance and possibly optimize the stabilization and maneuverability of a missile or an aircraft forebody. Specific patterns of deployment and/or retraction of the flow effectors 12 can be determined to handle a variety of routine events and also incorporated into the control scheme.

Figure 5:
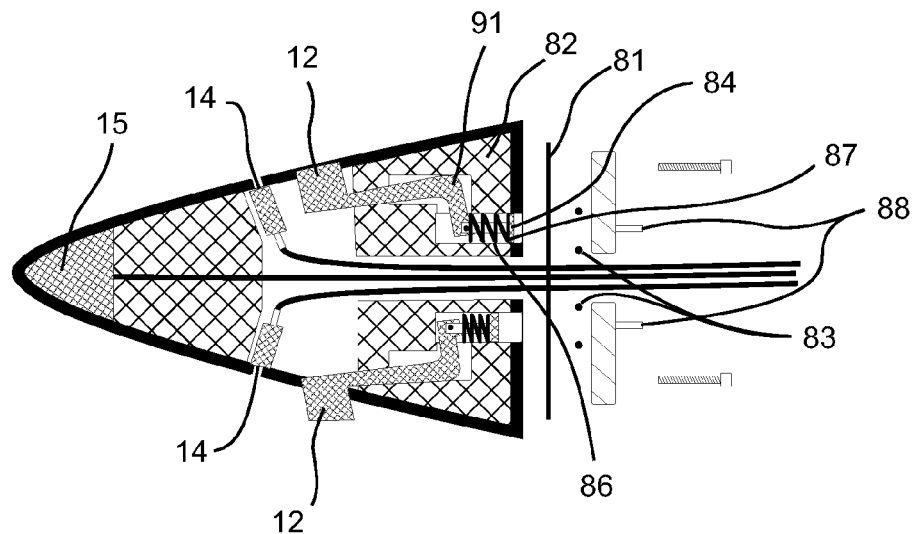
FIG. 5. Sectional view of one embodiment of the forebody section of a missile or aircraft having flow effectors and sensors mounted therein.

FIG. 5 is a sectional view of one embodiment of the forebody (nose) section of a missile or aircraft having a flow effector 12 and sensor 14 mounted therein. In FIG. 5, the two activatable flow effectors 12 shown in this cross-section are movably attached by an attachment means, e.g., a hinge 91, to a base structure 82. The activatable flow effectors 12 are deployable flow effectors. The activatable flow effectors 12 are further movably attached to a piston 84. The piston 84 moves within a cylinder 86 in response to a pressure source (not shown) applied via a pneumatic system (not shown) against an elastomeric sheet 81 to move the pistons 84 and in return to deploy and retract the flow effectors 12. The piston 84 also is connected to a biasing means 87, e.g., a spring, to return the piston 84 to its original position upon removing the pressure source, thereby retracting the deployable flow effector 12. In this particular embodiment, the pressure is applied to the piston 84 via a pressure inlet/outlet 88. Also shown in this particular embodiment are seals in the form of O-rings 83 to seal the pneumatic system (not shown) of the pressure source (not shown); and two sensors 14. The sensors 14 are connected via leads to a controller (not shown). The pressure source (not shown) is also connected to the controller (not shown). The forebody in FIG. 5 also provides a radome and sensor 15 for sending and/or receiving external signals related to the aircraft's or missile's relative position and/or to identify targets. The sensor could for example consist entirely of an antenna such as one for receiving GPS signals from satellites or for receiving passive radar signals. The sensor also could be a radar or laser sensor for actively identifying targets or objects. The sensor also could include those other types of sensors known to those skilled in the art for maneuvering or stabilizing the missile or aircraft of the present invention or to be used in the systems or methods of the present invention.

Figure 6:
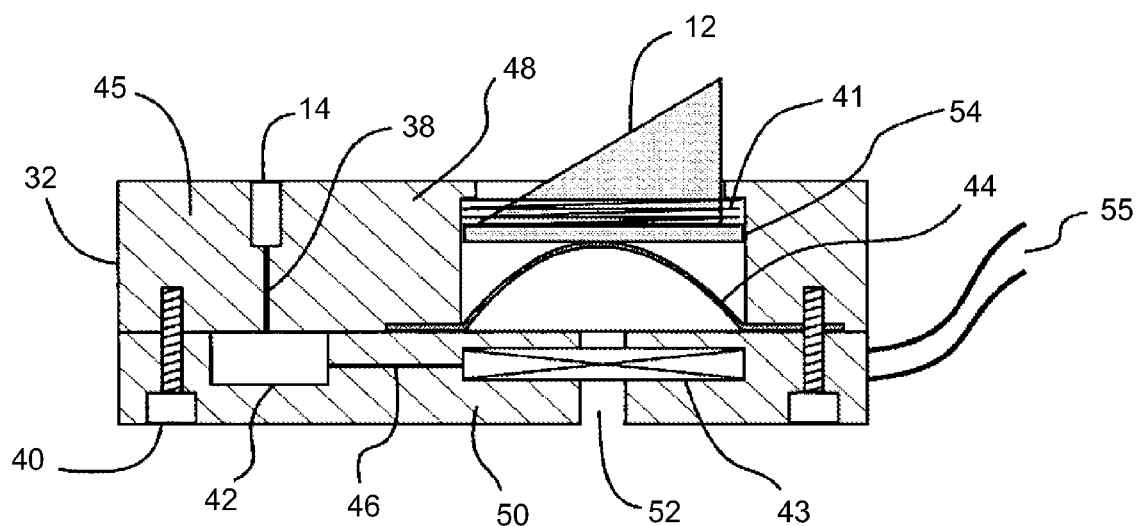
FIG. 6. Sectional view of one embodiment of a deployable flow effector.

FIG. 6 is a sectional, detailed view of a module 32 (as shown in FIG. 4) with an activatable deployed flow effector 12, the module having an external electrical connector or connection 55. In FIG. 6, the flow effector 12 is movably attached to the upper portion 48 of the housing 45 of the module 32 and is attached to the lower portion 50 of the housing 45 of the module 32 by at least two fasteners 40. The upper portion 48 of the housing 45 mates with the lower portion 50 with a sealing ring (not shown) and a sealable, flexible element 44 there between. The flow effector 12 is deployed by pressure being applied to the flexible element 44. The flow effector 12 has a biasing means (a spring) 41 which attaches at one end to the upper portion 48 of the housing 46 and at the other end to the base 54 of flow effector 12. Directly beneath the flow effector 12 is a valve 43, which opens and closes to allow for the application of fluid or gas pressure from a pressure source not shown to be applied to the flexible element 44 through a pneumatic pathway 52. A pressure sensor 14 senses fluid flow at or near the surface over which the fluid is flowing. Preferably the pressure sensor at the surface of the airfoil, and most preferably it is flush with such surface. The pressure sensor 14 can be any pressure sensor but advantageously is a microelectromechanical (MEMS) based or piezoelectric based sensor. The sensor transmits a signal, in this case a voltage but it is understood to one skilled in the art that the signal can be other than voltage, including, but not limited to, current, pressure, hydraulic or optical. The signal corresponds to the pressure it senses.

The pressure sensor 14 and other sensors (not shown) are connected to a controller 42 internal to the module 12 (or optionally external to the module). The controller 42 can be for example a proportional-integral-derivative (PID) controller, an adaptive predictive controller, or an adaptive predictive feedback controller. The controller of the present invention is preferably a closed loop control system. The controller can be used to minimize side forces or to create commanded side forces on the missile or aircraft forebody. The pressure sensor transmits a signal to the controller 42 through the electrical connection 38 (in practical application, multiple pressure sensors 14 send multiple signals to the controller 42). The controller 42 processes the signals to determine, through mathematical modeling, the dynamics of the flow surface or estimates or determines the relative position of the missile or aircraft. Such dynamics include boundary layer separation and stall. The controller 42 also helps maneuver the aircraft or missile to a target or away from or around an obstacle. It is the predictive ability of the controller 42 that provides for this function and expands this system from being merely responsive. This is especially advantageous for dynamic systems, which are nonlinear and time-varying and operate in challenging environments. The controller 42 produces an output signal to a monitor, recorder, alarm and/or any peripheral device for alarming, monitoring, or in some manner, affecting or precluding the dynamics upon its incipience.

Advantageously, the controller 42 is the ORICA™ controller, an extended horizon, adaptive, predictive controller, produced by Orbital Research, Inc. and patented under U.S. Pat. No. 5,424,942, which is incorporated herein by reference. Under certain conditions, the controller 42 (or optionally an external controller) which is connected via electrical connection 46 (or optionally via external electrical connection 55) to the valve 43 causes the valve 43 to open thereby resulting in the deployment of the flow effector(s) 12. Preferably, the pressure source (or other deployment and/or retraction means) is internal to the module 12. The sealable, flexible element 44 referred to above can be made of a single polymer or a combination of polymers. The pressure source can be air bled from an aircraft turbine engine, a pressurized gas cartridge, or pressurized fluid. The biasing means is employed to urge the sealable, flexible element 44 towards its quiescent state after pressure is removed or reduced. The biasing means can be any device or spring like means, such as vacuum or pressure, mechanical or electromechanical device. Other means for the controller to maneuver the missile or aircraft include but are not limited to impact point prediction methods, trajectory matching, way point navigation and the like.

Figure 7:
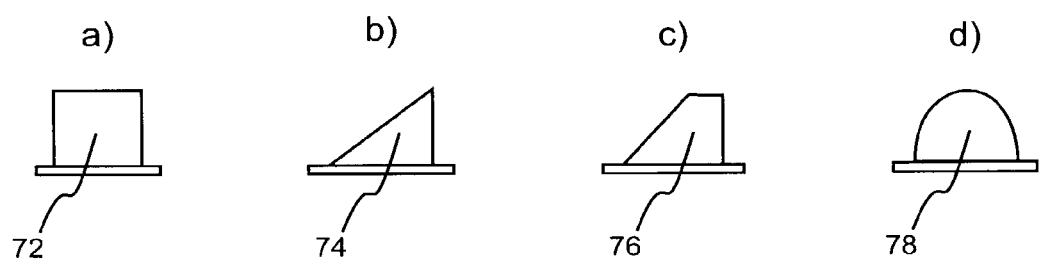
FIG. 7. Sectional view of deployable flow effector shapes.

The deployable portion of the activatable, deployable flow effectors shown in the previous figures are small mechanical tabs preferably made from epoxy glass-fabric, and deactivate to assume a position underneath the skin surface of the missile or aircraft in their retracted state. Several examples of various embodiments of the flow effectors are shown in FIG. 7. *a, b, c* and *d*. These cross-sectional views demonstrate that rectangular 72, triangular 74, irregular 76, semi-circular 78, and square not shown can be used. The present invention is, however, not limited to these shapes and it is envisioned that any shape of flow effector known presently or conceived of in the future by those skilled in the art may be used. Upon controlled activation, the flow effectors (deployable or other) manipulate the forebody of the missile or aircraft's vortical flow field to generate the desired side forces or yawing moment. Single flow effectors or combinations of flow effectors can be activated either statically or cycled at a varying frequency (oscillated) to obtain a desired side force or yawing moment. Varying frequency or oscillation of the flow effectors includes but is not limited to pulse width modulation or other techniques known to those skilled in the art. Commercial solenoids can also be used to deploy deployable flow effectors as well.

Figure 8:
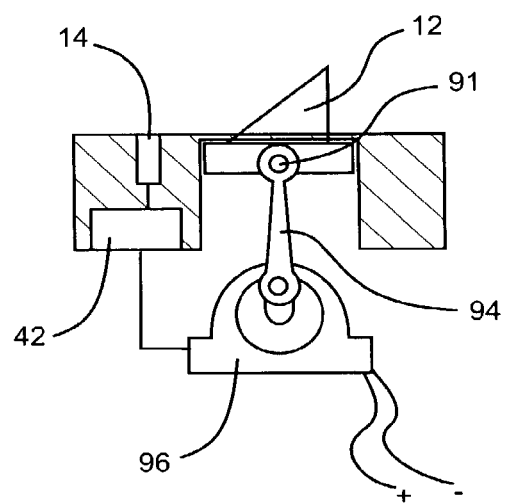
FIG. 8. Sectional view of another embodiment of a deployable flow effector.
Figure 9A:
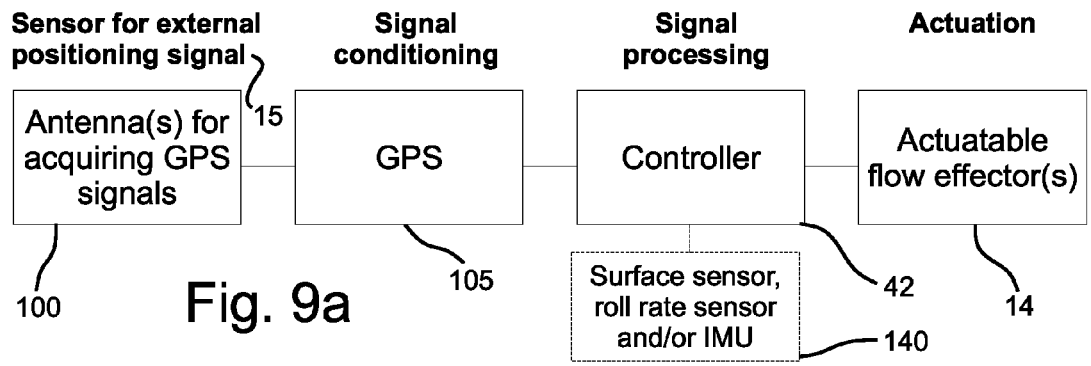
FIG. 9. Schematic of various embodiments of sensors used to control missile or aircraft stability or maneuverability.
Figure 9B:
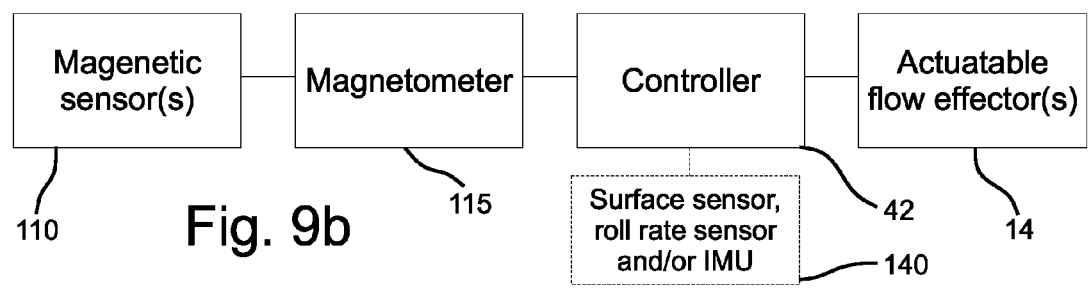
Figure 9C:
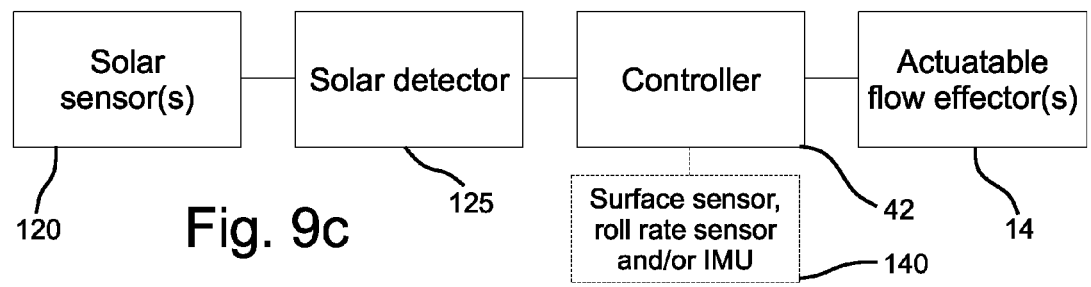
Figure 9D:
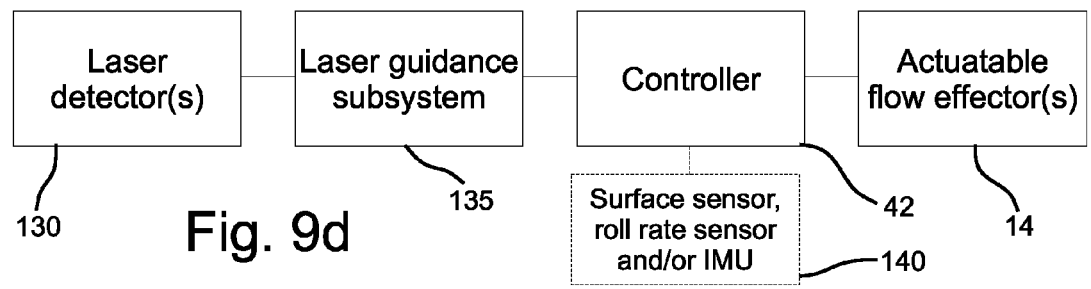

FIG. 8 is a sectional view of another embodiment of a deployable flow effector. In FIG. 7, the activatable flow effectors 12 are deployable flow effectors. The flow effectors 12 are further movably attached to a camshaft 94. The camshaft 94 moves in response to an electric motor 96 to deploy and retract the flow effector 12. The motor is connected to a controller 42. The controller 42 activates and deactivates the deployable flow effector in response to at least in part the signal from the sensor 14.

FIG. 9 is a schematic showing various embodiments of sensors used to control missile or aircraft stability or maneuverability. FIG. 9*a* identifies an embodiment for using the signal from commercial or military GPS satellites 100. The sensor 100 picks up an external positioning signal 15. Preferably, the signal can be conditioned with various filters and other electronics 105, whereupon the signal 15 is processed preferably with an onboard controller 42. The controller 42 may also use the signals from the missile's or aircraft's other sensors such as surface sensors, roll sensors or IMU 140 to actuate the missile's or aircraft's activatable flow effector(s) 14. FIG. 9*b* identifies an embodiment for using the signal a magnetic sensor 110. The sensor 110 picks up a magnetic signal from the Earth 15 used to identify the missile's or aircraft's location or relative position with respect to the Earth. Preferably, the signal can be conditioned with various filters and other electronics 115, wherein the signal 15 is processed preferably with an onboard controller 42. The controller 42 may also use the signals from the missile's or aircrafts other sensors such as surface sensors, roll sensors or IMU 140 to actuate the missile's or aircraft's activatable flow effector(s) 14. FIG. 9*c* identifies an embodiment for using the signal or information from the sun 15. The sensor 120 picks up an external positioning signal 15. Preferably, the signal can be conditioned with various filters and other electronics 125, wherein the signal 15 is processed preferably with an onboard controller 42. The controller 42 may also use the signals from the missile's or aircrafts other sensors such as surface sensors, roll sensors or IMU 140 to actuate the missile's or aircraft's activatable flow effector(s) 14. FIG. 9*d* identifies an embodiment for using the signal a laser being pointed on a target or position that the missile is supposed to strike. The sensor 130 picks up an external positioning signal 15. Preferably, the signal can be conditioned with various filters and other electronics 135, wherein the signal 15 is processed preferably with an onboard controller 42. The controller 42 may also use the signals from the missile's or aircrafts other sensors such as surface sensors, roll sensors or IMU 140 to actuate or missile's or aircraft's activatable flow effector(s) 14.

Figure 10:
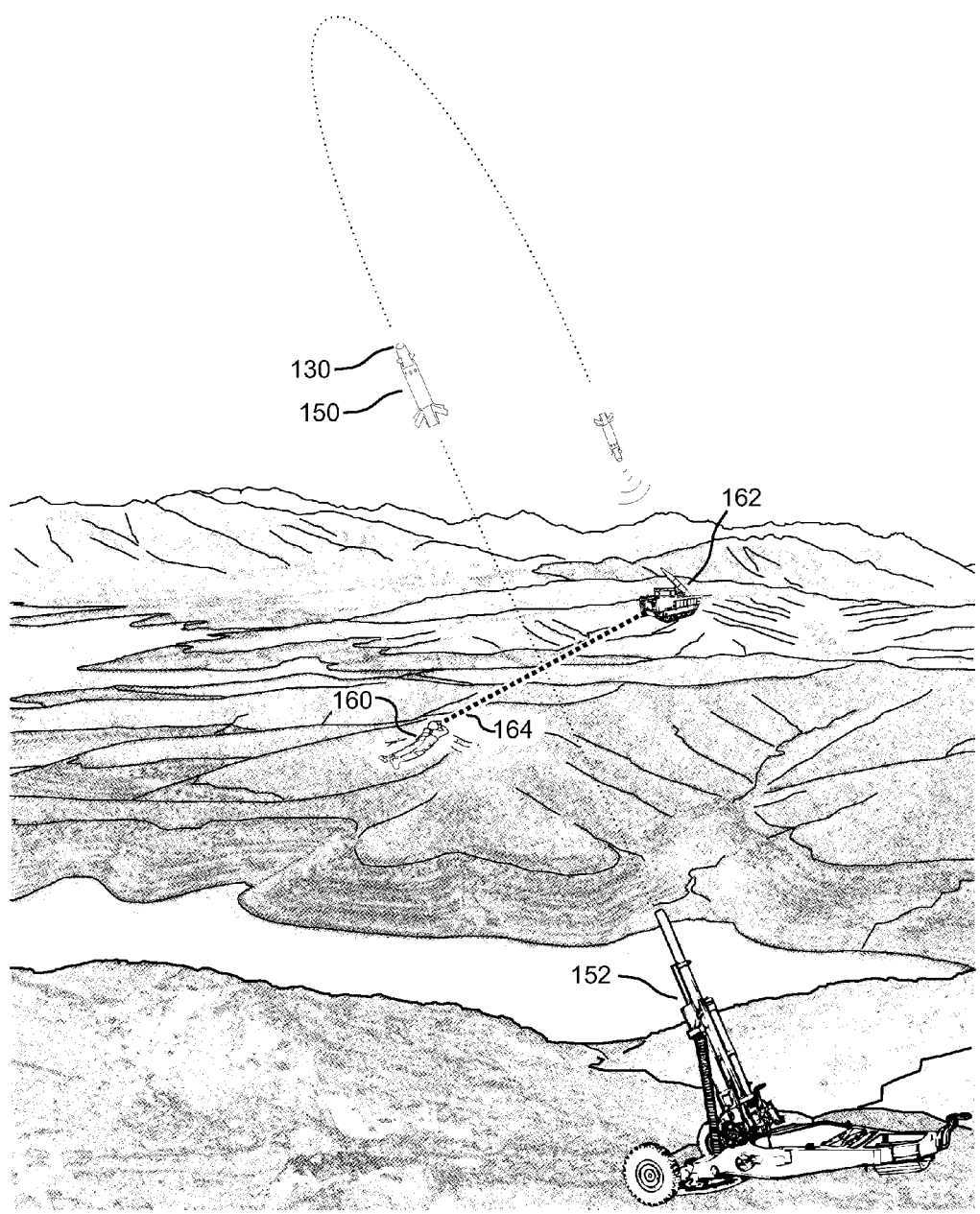
FIG. 10. Schematic of one embodiment of the methods and devices of the present invention.

FIG. 10 is a schematic of one embodiment of the methods and devices of the present invention. In FIG. 10, a 105-mm or 155-mm munition 150 is launched by artillery 152 based on initial coordinates provided by a forward observer 160. The munition 150 has a radome with a laser sensor 130. A forward observer 160 identifies a target 162 and follows that target with a laser 164, the location which is picked up by the laser sensor 130 once the munition 150 has a line of site to the target 162. The controller (not shown) then activates the munition's activatable flow effectors (not shown) to cause the munition 150 to deviate from its original course to strike the target 162.

Figure 11:
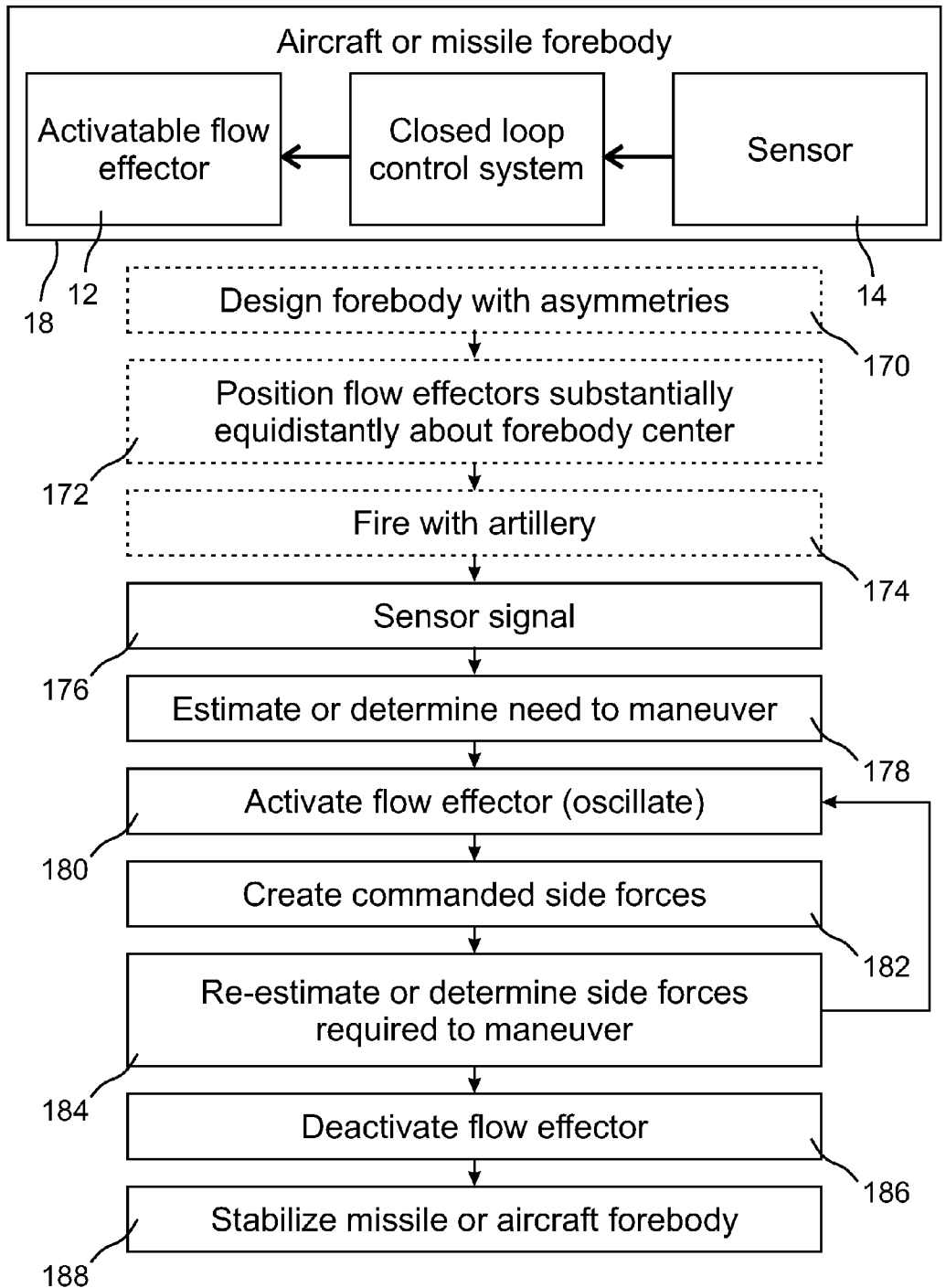
FIG. 11. Flow chart of some embodiments of the methods of the present invention.

FIG. 11 is a flow chart showing the steps for some embodiments of the present invention, which are methods of maneuvering or stabilization 188 for a missile or aircraft forebody. Aircraft or missile forebody 18 includes sensor 14 whose signal is fed into a closed loop control system which in turn actuates activatable flow effector 12. The forebody may be designed with asymmetries 170. Multiple flow effectors may be positioned substantially equidistantly 172 about the forebody center. The aircraft or missile may be fired with artillery 174. Once airborne, the sensor 14 produces a sensor signal 176, which serves as the basis, at least in part, for an estimation or determination of a need to maneuver or stabilize 178 the missile or aircraft. The closed loop control system then activates the flow effector by oscillating it 180. This activation of the flow effector creates commanded side forces 182. The side forces required to maneuver or stabilize the missile or aircraft are then re-estimated or determined 184 based at least in part on the signal from the sensor 14. When it is determined that there is a reduced need for commanded side forces, the flow effector is deactivated 186.

Preferably, the methods and systems of the present invention can guide or maneuver the missile to within 50 meters of the target, more preferably within 30 meters of the target, even more preferably within 20 meters of the target, still more preferably within 10 meters of the target, still yet more preferably within 5 meters of the target, and most preferably within 1 meter of the target. Preferably, the methods and systems of the present invention are able to achieve these functional advantages over missile launch to target strike distances of greater than 1 kilometer, more preferably greater than 10 kilometers, still more preferably greater than 25 kilometers, even more preferably greater than 50 kilometers, and most preferably at distances greater than 100 kilometers. Preferably, the methods and systems of the present invention allow the target strike radius of passive missile munitions to be moved by at least 10% of the target distance, more preferably by at least 20% of the target distance and most preferably by at least 30% of the target distance.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed:

1. A flow control system for a missile or aircraft forebody comprising
   a. at least one activatable micro-vortex generator;
   b. at least one sensor generating a signal, the at least one sensor being used to maneuver the missile or aircraft;
   c. an inertial measurement unit having an output; and
   d. a closed loop control system;
   wherein the closed loop control system is used for activating and deactivating the at least one micro-vortex generator based at least in part on the signal of the at least one sensor and the output of the inertial measurement unit.

2. The flow control system in claim 1, comprising at least four activatable micro-vortex generators.

3. The flow control system in claim 1, comprising at least six activatable micro-vortex generators wherein the at least six activatable micro-vortex generators are positioned and separated substantially equidistantly about a center of the forebody of the missile or aircraft.

4. The flow control system in claim 1, wherein the micro-vortex generator is capable of being activated and deactivated at frequencies of at least 1 Hz.

5. The flow control system in claim 1, wherein the micro-vortex generator is capable of being activated and deactivated at frequencies of at least 20 Hz.

6. The flow control system in claim 5, wherein the closed loop control system activates and deactivates the at least one micro-vortex generator to create additional side forces on the missile or aircraft forebody.

7. The flow control system in claim 1, wherein the closed loop control system activates and deactivates the at least one micro-vortex generator to create commanded side forces on the missile or aircraft forebody.

8. A method of stabilization for a missile or aircraft forebody comprising the steps of
   a. estimating or determining a need to stabilize a missile or an aircraft based at least in part on a signal from at least one sensor used to stabilize the missile or aircraft; the missile or aircraft forebody further comprising at least one activatable micro-vortex generator and a closed loop control system for controlling the at least one micro-vortex generator;
   b. activating the at least one micro-vortex generator to create commanded side forces by oscillation of the at least one micro-vortex generator with the closed loop controller based on at least in part the signal of the at least sensor;
   c. re-estimating or determining the side forces required to stabilize the missile or aircraft based at least in part on a signal from the at least one sensor; and
   d. deactivating the at least one micro-vortex generator in response to reduced need for commanded side forces.

9. The method of stabilization in claim 8, wherein the at least one micro-vortex generator is activated by oscillating the at least one micro-vortex generator.

10. The method of stabilization in claim 8, wherein the least one activatable micro-vortex generator comprises at least six activatable micro-vortex generators wherein the at least six activatable micro-vortex generators are positioned and separated substantially equidistantly about a center of the forebody of the missile or aircraft.

11. The method of stabilization in claim 8, wherein the forebody of the missile or aircraft is designed with asymmetries in the forebody.

12. The method of stabilization in claim 8, wherein the aircraft or missile is a munition fired with artillery.

13. The method of stabilization in claim 8, wherein the at least one micro-vortex generator is a deployable micro-vortex generator.

* * * * *